(12) United States Patent
Ahmad et al.

(10) Patent No.: US 9,047,474 B1
(45) Date of Patent: Jun. 2, 2015

(54) CIRCUITS FOR AND METHODS OF PROVIDING ISOLATION IN AN INTEGRATED CIRCUIT

(71) Applicant: Xilinx, Inc., San Jose, CA (US)

(72) Inventors: Sagheer Ahmad, Cupertino, CA (US); Bradley L. Taylor, Santa Cruz, CA (US); Ygal Arbel, Morgan Hill, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 14/187,143

(22) Filed: Feb. 21, 2014

(51) Int. Cl.
*H03K 19/00* (2006.01)
*G06F 21/60* (2013.01)
*H03K 19/177* (2006.01)

(52) U.S. Cl.
CPC .......... *G06F 21/60* (2013.01); *H03K 19/17768* (2013.01)

(58) Field of Classification Search
CPC .... G06F 21/60; G06F 21/76; H03K 19/17768
USPC .............................. 326/8, 9, 37–41
See application file for complete search history.

(56) References Cited

U.S. PATENT DOCUMENTS

| | | | |
|---|---|---|---|
| 5,698,992 A | 12/1997 | El Ayat et al. | |
| 7,343,579 B2 | 3/2008 | Coxe et al. | |
| 7,519,831 B2 | 4/2009 | LeQuere | |
| 7,797,651 B1 | 9/2010 | Jacobson et al. | |
| 7,949,974 B1 | 5/2011 | Moore et al. | |
| 8,713,327 B1 * | 4/2014 | Peterson et al. | 713/191 |
| 2006/0133604 A1 | 6/2006 | Buer et al. | |
| 2007/0103193 A1 | 5/2007 | Reblewski et al. | |
| 2007/0118876 A1 | 5/2007 | Singh et al. | |
| 2007/0176631 A1 | 8/2007 | Bakker et al. | |
| 2007/0245141 A1 | 10/2007 | O'Keeffe et al. | |
| 2007/0245413 A1 | 10/2007 | Andolina et al. | |
| 2009/0060197 A1 | 3/2009 | Taylor et al. | |
| 2009/0119773 A1 | 5/2009 | D'Amore et al. | |
| 2009/0128186 A1 | 5/2009 | Balasubramanian et al. | |
| 2010/0077226 A1 | 3/2010 | Senga et al. | |
| 2010/0125739 A1 | 5/2010 | Creary et al. | |
| 2010/0142371 A1 | 6/2010 | Gooch et al. | |
| 2012/0216242 A1 * | 8/2012 | Uner et al. | 726/1 |
| 2014/0115330 A1 * | 4/2014 | Chen | 713/166 |

OTHER PUBLICATIONS

U.S. Appl. No. 12/364,030, filed Feb. 2, 2009, Peterson, Edward S. et al., Xilinx, Inc., 2100 Logic Drive, CA USA.
General Dynamics, "Programmable Objective Encryption Technologies Advanced Cryptographic Module", General Dynamics C4 Systems, {Retrieved from Internet Nov. 21, 2011], http://www.gdc4s.com/documents/GD-POET-w2.pdf.

(Continued)

*Primary Examiner* — Don Le
(74) *Attorney, Agent, or Firm* — John J. King

(57) ABSTRACT

A circuit for providing isolation in an integrated circuit is described. The circuit comprises a first circuit block having circuits associated with a first security level; a second circuit block having circuits associated with a second security level; and a third circuit block having programmable resources, the third circuit block providing isolation between the first circuit block and the second circuit block and being programmable to enable connections between the first circuit block and the second circuit block.

20 Claims, 10 Drawing Sheets

(56) References Cited

OTHER PUBLICATIONS

General Dynamics, "Technical Requirements Document for the Programmable Objective Encryption Technologies Advanced Cryptographic Module", General Dynamics C4 Systems, {Retrieved from Internet Nov. 21, 2011], http://cryptome.org/poet-acm.htm.
McLean, Mark et al., "FPGA-Based Single Chip Cryptographic Solution (U)," *Military Embedded Systems*, Mar. 2007, pp. 34-37.
Pereira et al., "SSDR—Reconfigurable Firewall: Reconfiguration Model Impact", 2008, IEEE pp. 93-97.
Zeineddini et al., "Secure Partial Reconfiguration of FPGAs", 2005, IEEE pp. 155-162.
Altera Corporation, Cyclone V. Device Handbook, vol. 3: Hard Processor System Technical Reference Manual, Nov. 2012, 670 pages.
ARM, "CoreLink TrustZone Address Space Controller TZC-380", Revision r0p1, Technical Reference Manual, ARM DDi 0431C, Sep. 10, 2008, 82 pages.
U.S. Appl. No. 14/065,804, filed Oct. 29, 2013, Knopp et al., Xilinx, Inc., San Jose, CA USA.
U.S. Appl. No. 14/242,268, filed Apr. 1, 2014, Ahmad et al., Xilinx, Inc., San Jose, CA USA.

\* cited by examiner

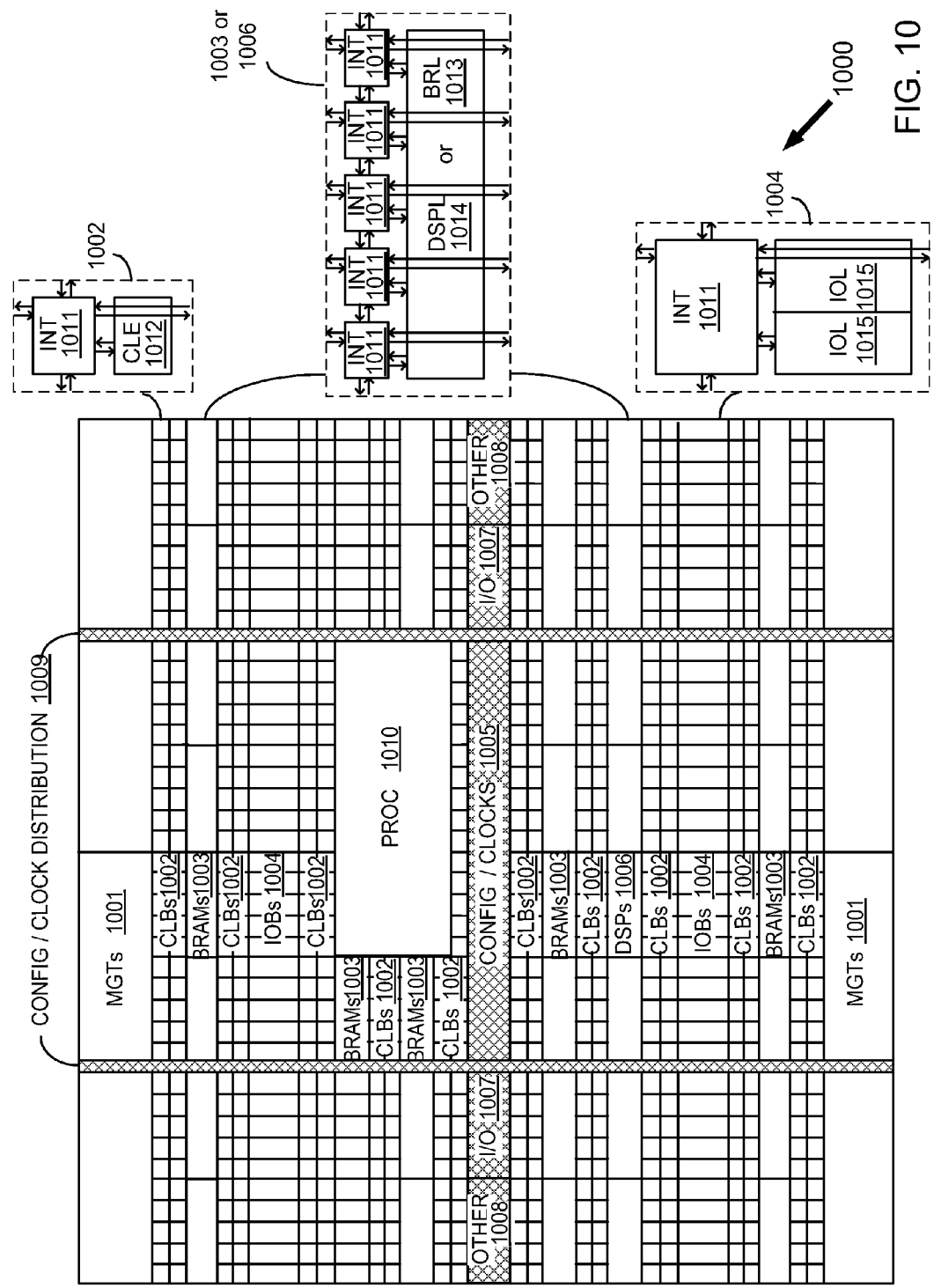

CIRCUITS FOR AND METHODS OF PROVIDING ISOLATION IN AN INTEGRATED CIRCUIT

FIELD OF THE INVENTION

The various circuits relate generally to integrated circuit devices, and in particular to circuits for and methods of providing isolation in an integrated circuit device.

BACKGROUND

Data processing is an important part of many circuits and systems. Data which may be processed in various circuits or systems may have different levels of security. In devices which process data, certain circuits may be designated to require different levels of security than other circuits. For example, data processed by some circuits may require a high level of security compared to other data, which generally requires a lower level of security. Examples of applications which have circuits that require a high level of security could be financial applications, military applications, medical applications, or any other application where compromised data could have an adverse effect. The compromised data may be intentionally altered by an adverse party, or inadvertently altered by virtue of the presence of the connections between the two types of circuits.

However, it is often necessary that circuits which process data having a high level of security interact with other circuits. Therefore, connections between the various circuits may provide an access point through which an unauthorized access may occur. As a result, the security of the data transferred between the circuits may be compromised, where the compromised data may present a risk to the user of the circuit or system, depending upon the application. Such a compromise may have an adverse effect on both the supplier of the circuit or system, as well as the user of the circuit or system.

SUMMARY OF THE INVENTION

A circuit for providing isolation in an integrated circuit is described. The circuit comprises a first circuit block having circuits associated with a first security level; a second circuit block having circuits associated with a second security level; and a third circuit block having programmable resources, the third circuit block providing isolation between the first circuit block and the second circuit block and being programmable to enable connections between the first circuit block and the second circuit block.

Another circuit for providing isolation in an integrated circuit comprises a low-power sub-system having circuits associated with a first security level; a full-power sub-system having circuits associated with a second security level; and programmable interconnect elements coupled between the low-power sub-system and the full-power sub-system, wherein the programmable interconnect elements provides isolation between the low-power sub-system and the full-power sub-system, and connections between the low-power sub-system and the full-power sub-system are enabled by the programmable interconnect elements.

A method of providing isolation in an integrated circuit is also described. The method comprises providing a first circuit block having circuits associated with a first security level; providing a second circuit block having circuits associated with a second security level; implementing a third circuit block having programmable resource; and providing, by the third circuit block, isolation between the first circuit block and the second circuit block, wherein the third circuit block is programmable to enable connections between the first circuit block and the second circuit block.

Other features will be recognized from consideration of the Detailed Description and Claims, which follow.

BRIEF DESCRIPTION OF THE DRAWINGS

FIG. 10 is a block diagram of an integrated circuit having programmable resources;

DETAILED DESCRIPTION OF THE DRAWINGS

The various circuits and methods set forth below relate to circuits for and methods of providing isolation in an integrated circuit. A system which consists of multiple heterogeneous sub-systems may require an isolation means to be able to isolate sub-systems from each other. For some security and/or safety critical heterogeneous systems, it is beneficial to isolate sub-systems such that there are no interfaces or sidebands between two sub-systems which can be compromised by software or hardware of one sub-system to observe or influence one or more other sub-system.

In some security applications, circuits having different security levels are often described as "Red" for a high level of security or "Black" for a lower level of security, where isolation is beneficial between the Red circuits and the Black circuits. The Red-Black isolation according to the various circuits and methods set forth below isolates all communication channels between Red and Black sub-systems by clamping signals at the Red boundary.

By way of example, a processing system according to the various circuits and methods may consists of two sub-systems: low-power subsystem (LPS) which may be a "Red" sub-system powered by low-power (LP) voltage, and full-power subsystem (FPS) which may be a "Black" sub-system powered by a full-power (FP) voltage. The LPS and FPS are connected via on-chip interconnects. As will be described in more detail below, the interconnects may be on a die or between die in a multi-chip module. For systems which need strict isolation between two sub-systems, it is required to isolate sub-systems such that there are no interfaces or sidebands between two subsystems which can be compromised by one sub-system to affect the other one. For example, the Red system may support secure unencrypted programs and data, while the Black system may support unsecure programs and data.

Figure 1:
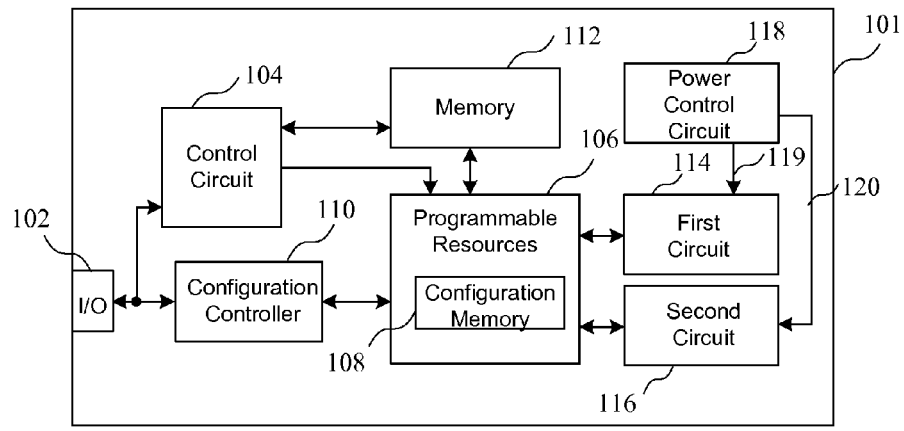
FIG. 1 is a block diagram of an integrated circuit device having programmable resources.

Turning first to FIG. 1, a block diagram of an integrated circuit device 101 having programmable resources is shown. The circuit of FIG. 1 is implemented in an integrated circuit having an input/output (I/O) port 102 coupled to a control circuit 104 and programmable resources 106. The programmable resources 106 include circuit elements which are configurable by a user of the circuit to implement a circuit design of the user's choice. The programmable resources 106 may include programmable logic, such as the programmable logic described in reference to FIGS. 10 and 11.

The circuits implemented in the programmable resources 106 may be implemented according to configuration bitstream downloaded to the integrated circuit 101. As will be described in more detail below, the programmable resources 106 include configuration memory 108. Generally, configuration memory 108 includes memory cells for configuring the programmable resources 106 based upon configuration bits of the configuration bitstream. Although a single block of programmable resources 106 and configuration memory 108 is shown, a given integrated circuit may include a plurality of blocks having programmable resources controlled by configuration memory. Also, the integrated circuit 101 may include a memory 112, such as a non-volatile memory external to the programmable resources 106, for storing configuration data. A configuration controller 110 may be implemented, as a part of or separate from the control circuit 104, to load the configuration data into the configuration memory 108. The configuration data may be loaded directly by the configuration controller 110 by way of the I/O port 102, or by way of the control circuit 104 and the memory 112.

The integrated circuit 101 may also comprise a first circuit 114 and a second circuit 116 which may be controlled by a power control circuit 118. More particularly, the power control circuit 118 may provide a first power signal 119 to the first circuit 114 and a second power signal 120 to the second circuit 116. As will be described in more detail below, the first power signal 119 may be a low voltage signal and the second power signal 120 may be a high voltage signal. By providing separate power lines, power coupling can be avoided, and the integrity of the signals can be maintained.

While first and second circuits are shown, it should be understood that more than two circuits could be implemented. Further, while the first and second circuits are shown separate from the programmable resources, it should be understood that portions or all of the first and second circuits could be implemented in the programmable resources 106. The circuit of FIG. 1 may be any device having programmable resources, such as a programmable logic device as described below, or an application-specific integrated circuit (ASIC) having a portion of circuits which is programmable. While all of the elements of FIG. 1 are shown as a part of a single integrated circuit, the elements could be implemented in multiple integrated circuits, or in different dies of a multi-chip module, such as the multi-chip module shown in FIG. 12.

Figure 2:
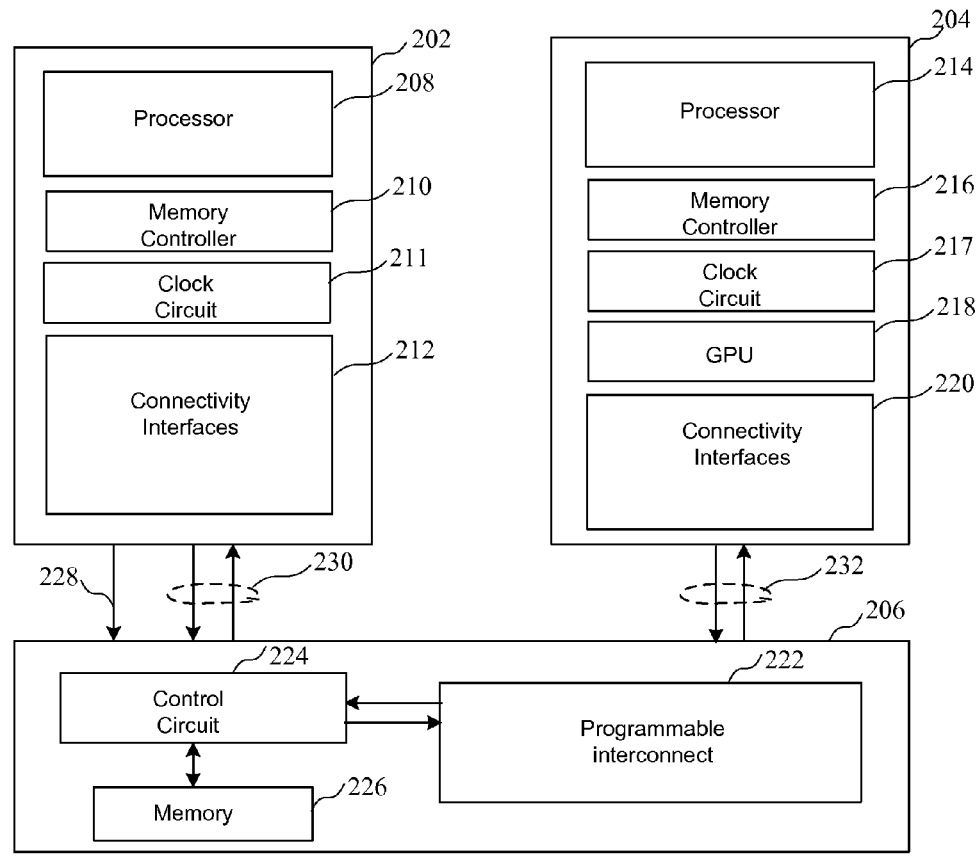
FIG. 2 is a block diagram of a plurality of circuits coupled by programmable resources.

Turning now to FIG. 2, a block diagram of a plurality of circuits coupled by programmable resources is shown. A first circuit 202 may be a low power sub-system (also known as a Red system), while a circuit 204 may be a full power sub-system (also known as a Black system). A circuit block 206 of programmable resources, which may also be referred to as programmable logic, may be configured to enable communication between the first circuit 202 and the second circuit 204. The first circuit may comprise a processor 208, a memory controller 210, a clock circuit 211, and connectivity interfaces 212. The second circuit 204 may comprise a processor 214, a memory controller 216, a clock circuit 217, a graphics processing unit (GPU) 218 and connectivity interfaces 220. Examples of connectivity interfaces 212 and 220 will be described in more detail in reference to FIG. 4. The circuit block 206 controls the transfer of data between first block 202 and the second block 204, and more particularly prevents any unauthorized access to either the first or second block by the other block. By way of example, the Red domain is required to access external DDR via the programmable interconnects 222, and the Black domain is required to access low speed peripherals via the programmable interconnects 222. The circuit block 206 can be configured to function as a mailbox to exchange messages or data.

The circuit block 206 comprises programmable interconnects 222 that are controlled by a control circuit 224 which is coupled to a memory 226. The circuit block 206 may receive control signals by way of a first connection 228. As will be described in more detail below, communication between the first circuit 202 and the second circuit 204 by way of a communication links 230 and 232 is enabled by the circuit block 206. Accordingly, the first circuit 202 and the second circuit 204 are isolated, and any communication between the first circuit 202 and the second circuit 204 is controlled by the circuit block 206. The circuit of FIG. 2 could be implemented in the integrated circuit of FIG. 1, where the first circuit 202 and the second circuit 204 would correspond to the first circuit 114 and the second circuit 116, respectively, and the circuit block 206 would correspond to the programmable resources 106.

Figure 3:
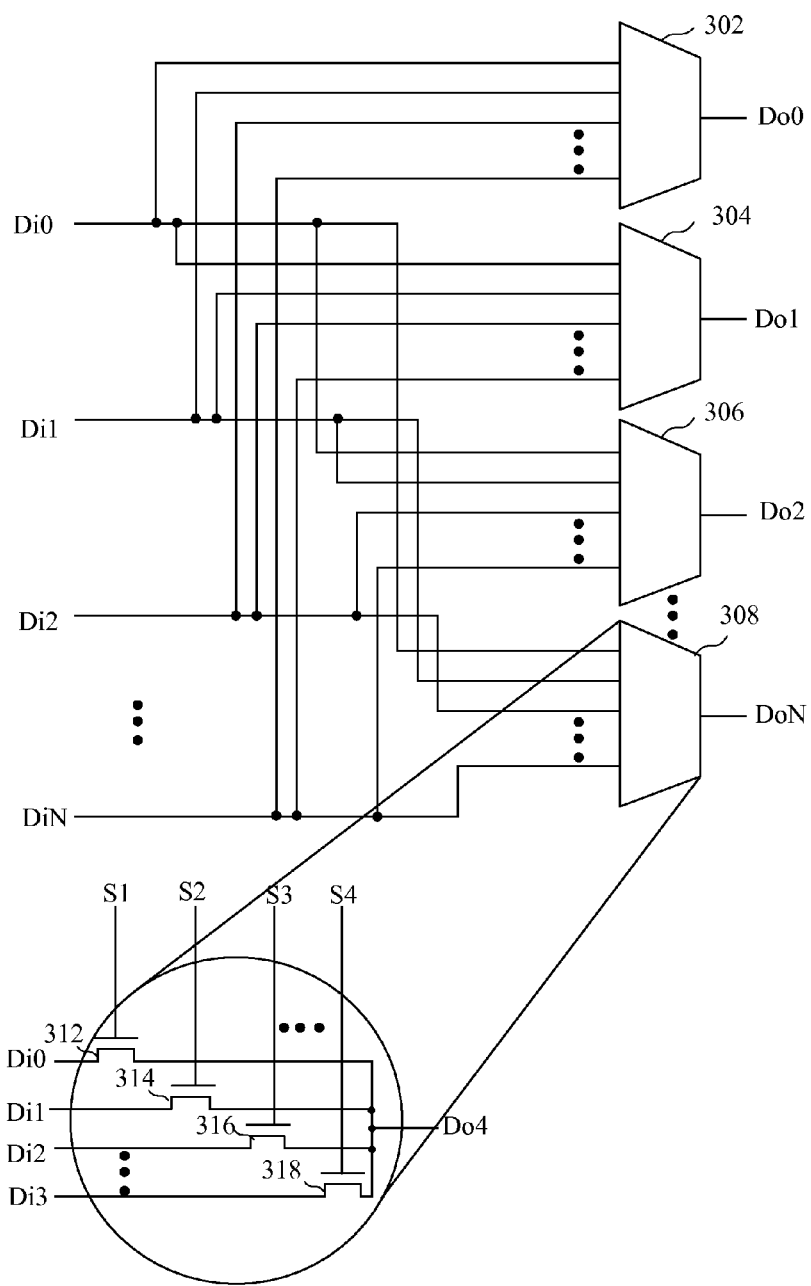
FIG. 3 is a block diagram showing the programmable resources of FIG. 2.

Turning now to FIG. 3, a block diagram showing programmable interconnects 222 of FIG. 2 is shown. The programmable interconnects comprise a plurality of multiplexers 302-308 which enable the routing of input signals Di0-DiN to various outputs Do0-DoN. An example of a multiplexer is shown as an enlarged portion of multiplexer 308 and comprises transistors 312-318 which are controlled by control signals S1-S4, respectively. As can be seen in FIG. 3, any one of the input signals Di0-DiN can be generated as any of the various outputs Do0-DoN, and can be used to provide isolation between the first circuit block 202 and the second circuit block 204. While FIG. 3 represents one example of an interconnect circuit which may be used to route data between registers, it should be understood that other interconnect circuits could be implemented.

Figure 4:
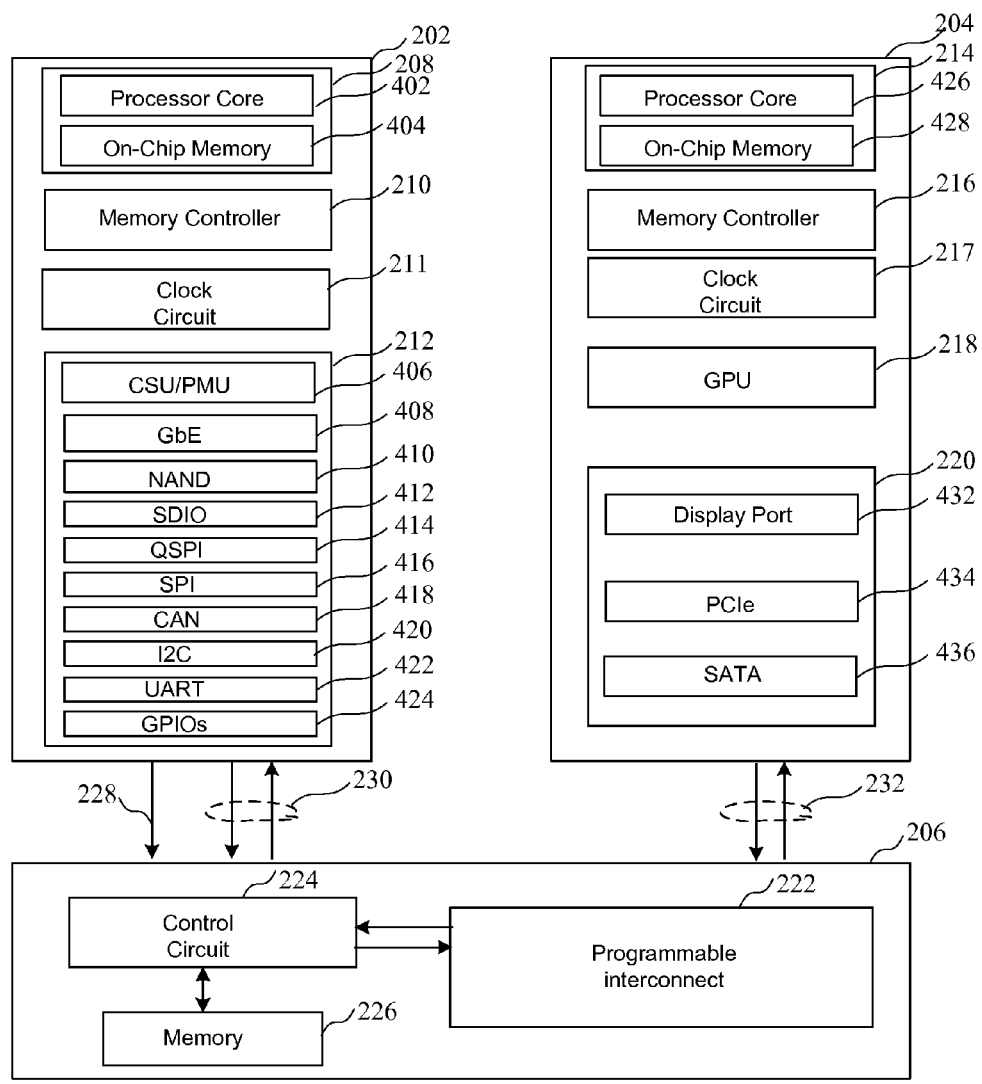
FIG. 4 is another block diagram of a plurality of circuits coupled by programmable resources.

Turning now to FIG. 4, another block diagram of a plurality of circuits coupled by programmable resources is shown. The processor 208 of the first circuit 202 comprises a processor core 402 and an on-chip memory 404. The connectivity interfaces 212 comprise a Power Management Unit (PMU) 406, a gigabit ethernet (GbE) interface 408, a NAND flash interface 410, and secure digital input output (SDIO) interface 412, a quad serial peripheral interface (QSPI) 414, a serial peripheral interface (SPI) 416, a controller area network (CAN) interface 418, an inter-integrated circuit (I2C) interface 420, a universal asynchronous receiver transmitter (UART) interface 422, and general purpose input/outputs (GPIOs) 424. The connectivity interface 220 of the second circuit 204 comprises a display port 432, a peripheral component interface express (PCIe) interface 434, a serial advanced technology attachment (SATA) interface 436. While specific connectivity interfaces are shown by way of example, it should be understood that other connectivity interfaces could be implemented.

Figure 5:
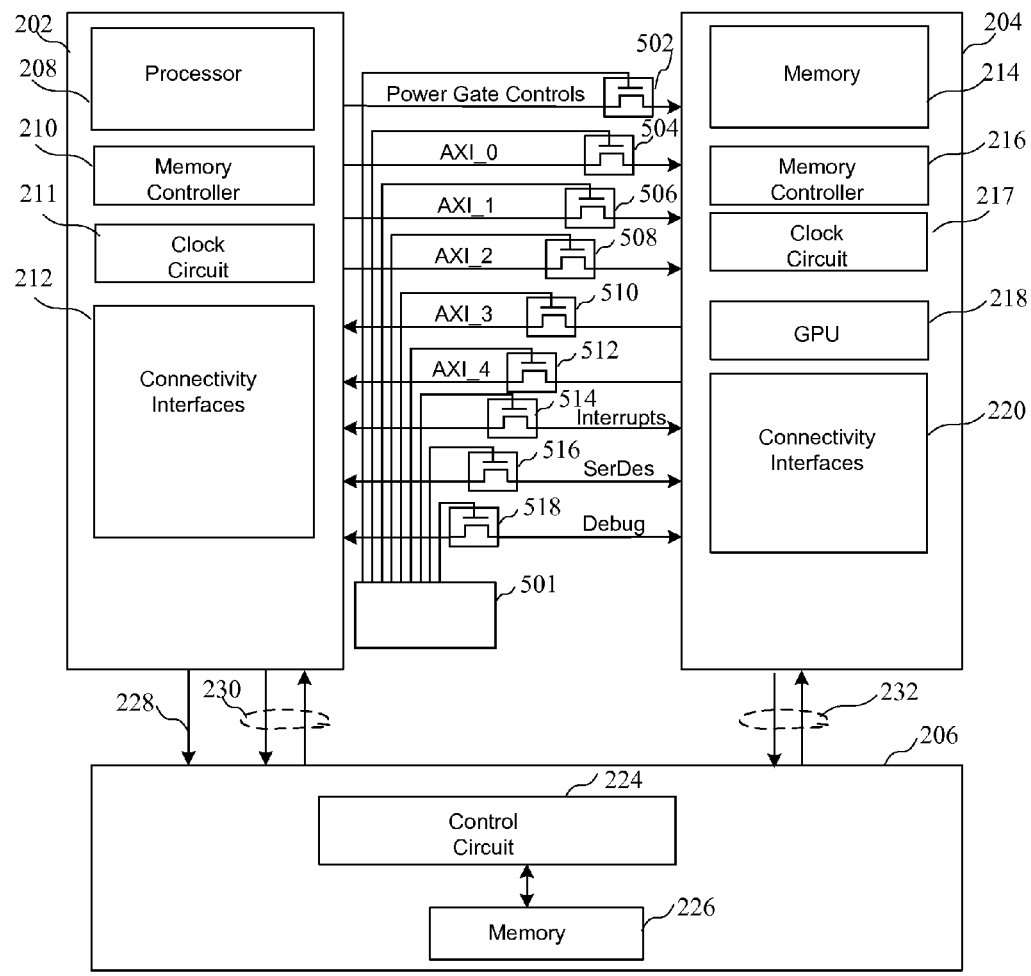
FIG. 5 is a block diagram of a plurality of circuits coupled by enable circuits controlled by a memory element.
Figure 6:
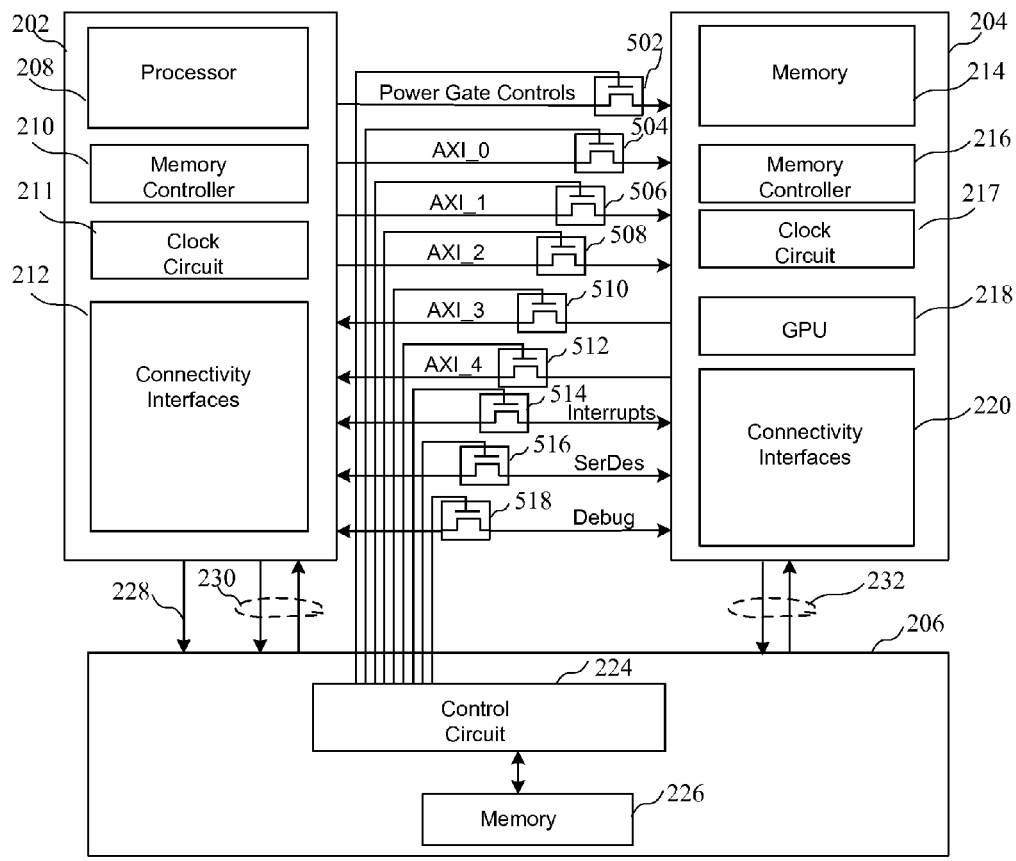
FIG. 6 is a block diagram of a plurality of circuits coupled by enable circuits controlled by a control circuit.
Figure 7:
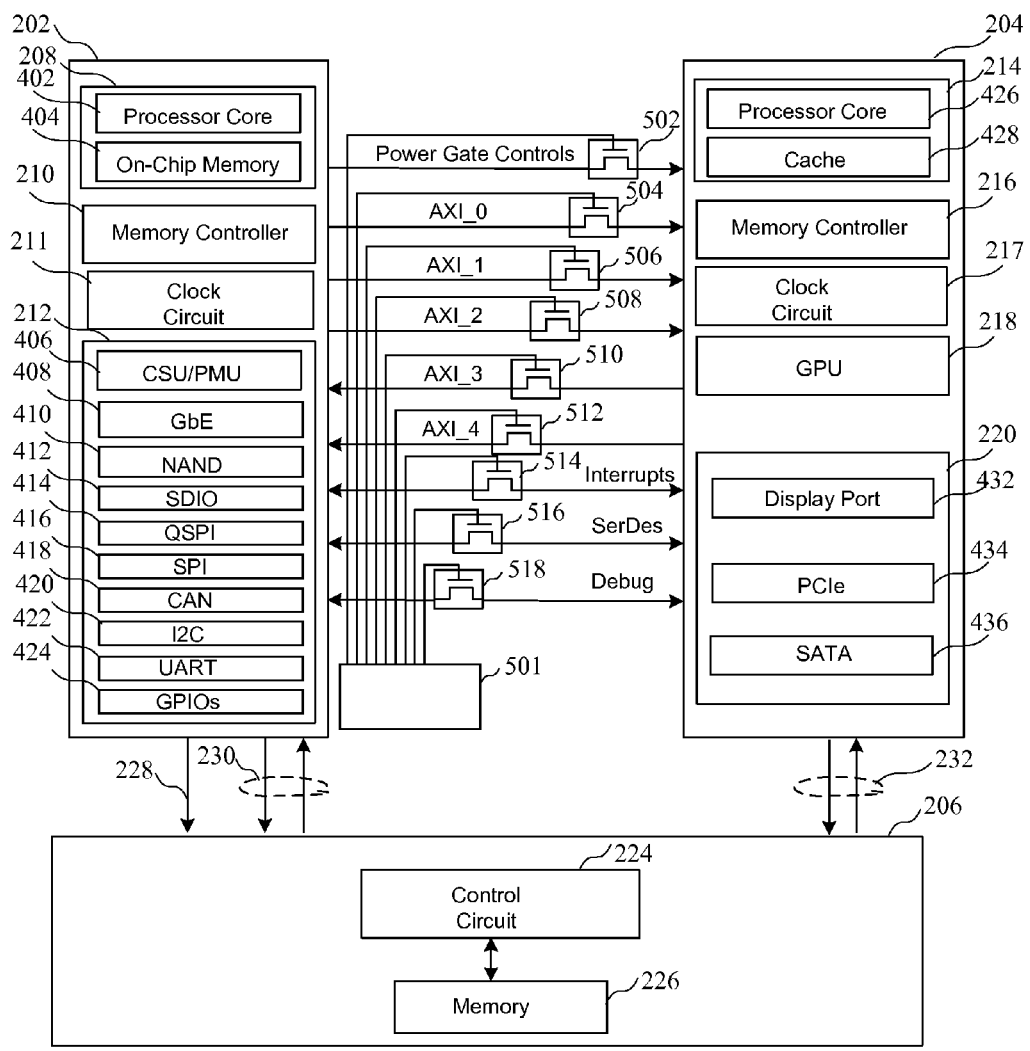
FIG. 7 is another block diagram of a plurality of circuits coupled by enable circuits controlled by a memory element.
Figure 8:
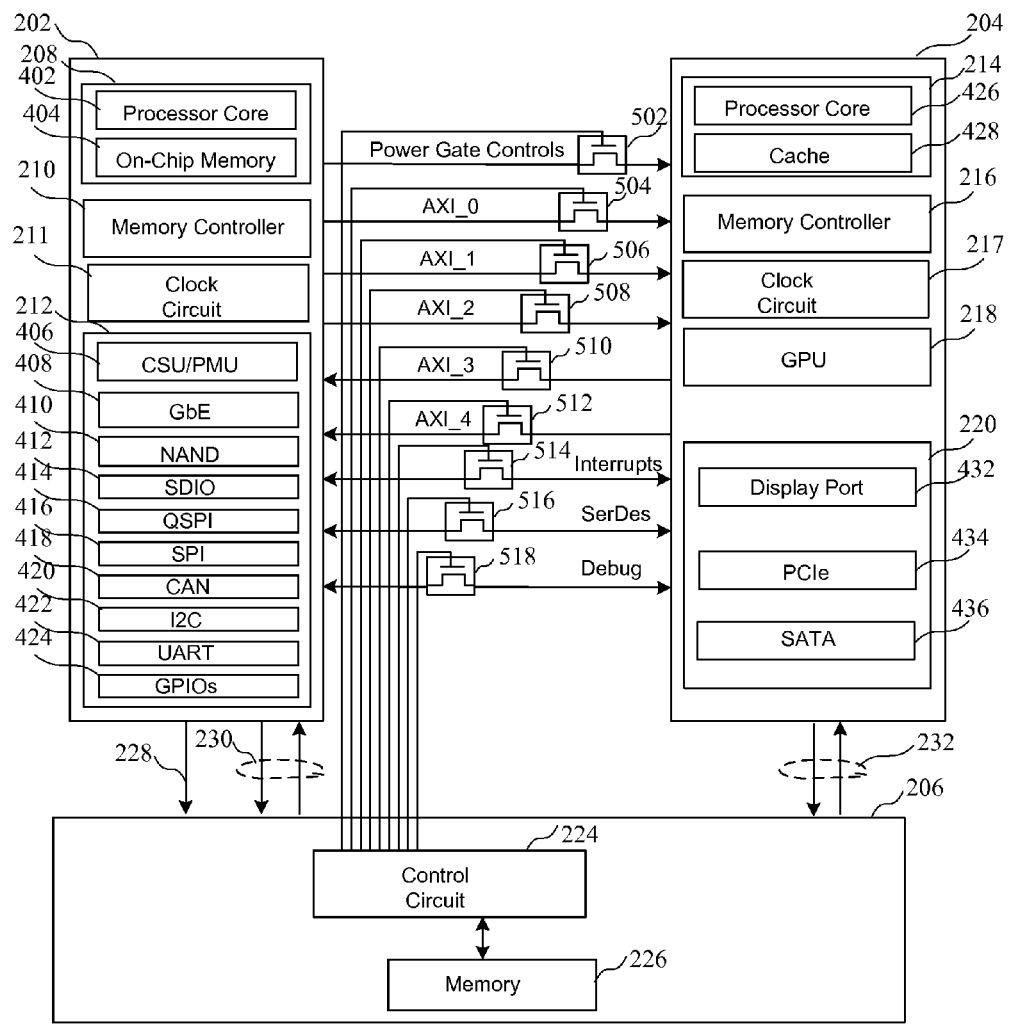
FIG. 8 is another block diagram of a plurality of circuits coupled by enable circuits controlled by a control circuit.

Turning now to FIG. 5, a block diagram of a plurality of circuits coupled by enable circuits is shown. As shown in FIG. 5, a memory element 501 stores control signals for controlling control gates which enable a direct connection between the first circuit block 202 and the second circuit block 204. For example, a first control gate 502 enables the coupling of power gate controls between the first circuit 202 and the second circuit 204. The memory element 501 may comprise a one-time programmable memory, for example. A plurality of advanced extensible interface (AXI) bus lines enable communication from the first circuit 202 to the second circuit 204, shown here by way of example as AXI_0-AXI_4 lines which are controlled by control gates 504-512, respectively. Interrupt signals, serial/deserial signals and debug signals coupled between the first circuit 202 and the second circuit 204 may be enabled by control gates 514-518, respectively. The control gates may comprise MOS transistors, for example, where the gate is controlled by a memory element of memory 501, for example. The memory 501 may be programmed by the first circuit 204 during an initial power-up for example, and may be reprogrammed during a partial reconfiguration, as will be described in more detail below. According to the circuit arrangement of FIG. 6, the control gates may be controlled by the control circuit 224. Control gates may be provided between various circuits of the first circuit 202 and the second circuit 204 of FIG. 4, where the control gates are controlled by a memory element 501 as shown in FIG. 7 or by the control circuit 224 as shown in FIG. 8.

All processor system peripherals and CPUs are assigned to Red or Black domains, where the first block 202 could comprises a first domain (e.g. a Red domain) and the second block 204 could comprise a second domain (e.g. a Black domain). The Red domain secure boot will start similar to a normal secure boot. A first stage boot loader (FSBL) will authenticate and decrypt (if required) a boot-loader for the processor 214 of the second circuit 204 of the Black domain. After boot completion, processor 214 would reply, through hardware or software handshake, to the processor 208, which will enable Red-Black isolation by writing to a triple-redundant once-writable register, such as the memory element 501 of FIG. 5 for example. That is, during an initial boot operation, the Red domain controls the Black domain until the processors of the Black domain boot, and then enables isolation between the Red domain and the Black domain.

All of the Black domain's primary clock sources, clock multiplexers, and their controls will be in the Black domain. Also, reset control registers for the Black domain will be in the Black domain. This would prevent any circuit of the Red domain from shutting off a clock of the Black domain. Also, the Black domain will be able to reset its own blocks, including the processor 214 after the initial boot operation. Similarly, the clock and reset controls of the Red domain will be in the Red domain registers.

Watch Dog Timers (WDTs) associated with each of the Red and Black domains may be implemented. For a Red domain to boot due to a WDT event, it can reset and boot after notifying a WDT event to control circuit 224 of the circuit block 206. The control circuit 224 may determine if it wants to allow a processor of the Black domain to reboot. Alternatively, the Black domain can reset and boot after notifying the control circuit 224 of the circuit block 206.

For an initial boot, a reset vector for the processor 214 of the Black domain will be set to HIVEC (High Vector) in an on-chip memory (OCM) address space, such as on-chip memory 404 for example, which is in the Red sub-system. The reset vector will have to be changed to LOVEC (Low Vector) address in a memory associated with the Black sub-system (which could be a DRAM in Black sub-system controlled by memory controller 216 or an external memory controlled by memory controller 216) after an initial boot, so individual processors of the Black domain, such as processor 214, can be reset and restarted from a DRAM for example. Therefore, the reset vectors for the processors of the Black domain are configurable to be HIVEC or LOVEC by a full-power domain register bit. Because the Red-Black boundary is same as a full power-low power domain crossing, the isolation provided by the circuit block 206 can be used to control power to the full-power sub-system to place the full-power sub-system in a reduced power mode.

Figure 9:
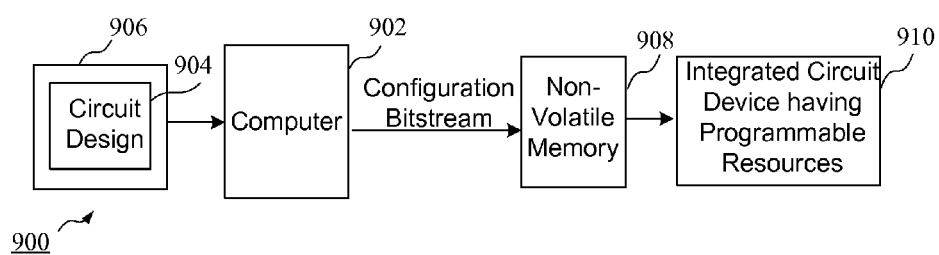
FIG. 9 is a block diagram of system for programming the integrated circuit device.

Turning now to FIG. 9, a block diagram of system for programming the integrated circuit device of FIG. 10 is shown. In particular, a computer 902 is coupled to receive a circuit design 904 from a memory 906, and generates a configuration bitstream which is stored in the non-volatile memory 906. As will be described in more detail below, the circuit design may be a high level design, such as a circuit design defined in a hardware description language (HDL). Also, the computer may be configured to run software that generates a configuration bitstream which is stored in the non-volatile memory 908 and provided to an integrated circuit 910 which may be a programmable integrated circuit, such as the integrated circuit described below in FIG. 10. As will be described above, bit of the configuration bitstream are used to configure programmable resources of the integrated circuit.

Turning now to FIG. 10, a block diagram of an integrated circuit having programmable resources is shown. While devices having programmable resources may be implemented in any type of integrated circuit device, such as an application specific integrated circuit (ASIC) having programmable resources, other devices comprise dedicated programmable logic devices (PLDs). One type of PLD is the Complex Programmable Logic Device (CPLD). A CPLD includes two or more "function blocks" connected together and to input/output (I/O) resources by an interconnect switch matrix. Each function block of the CPLD includes a two-level AND/OR structure similar to that used in a Programmable Logic Array (PLA) or a Programmable Array Logic (PAL) device. Another type of PLD is a field programmable gate array (FPGA). In a typical FPGA, an array of configurable logic blocks (CLBs) is coupled to programmable input/output blocks (IOBs). The CLBs and IOBs are interconnected by a hierarchy of programmable routing resources. These CLBs, IOBs, and programmable routing resources are customized by loading a configuration bitstream, typically from off-chip memory, into configuration memory cells of the FPGA. For both of these types of programmable logic devices, the functionality of the device is controlled by configuration data bits of a configuration bitstream provided to the device for that purpose. The configuration data bits may be stored in volatile memory (e.g., static memory cells, as in FPGAs and some CPLDs), in non-volatile memory (e.g., Flash memory, as in some CPLDs), or in any other type of memory cell.

The device of FIG. 10 comprises an FPGA architecture 1000 having a large number of different programmable tiles including multi-gigabit transceivers (MGTs) 1001, CLBs 1002, random access memory blocks (BRAMs) 1003, input/output blocks (IOBs) 1004, configuration and clocking logic (CONFIG/CLOCKS) 1005, digital signal processing blocks (DSPs) 1006, specialized input/output blocks (I/O) 1007 (e.g., configuration ports and clock ports), and other programmable logic 1008 such as digital clock managers, analog-to-digital converters, system monitoring logic, and so forth.

Some FPGAs also include dedicated processor blocks (PROC) 1010, which may be used to implement a software application, for example.

In some FPGAs, each programmable tile includes a programmable interconnect element (INT) 1011 having standardized connections to and from a corresponding interconnect element in each adjacent tile. Therefore, the programmable interconnect elements taken together implement the programmable interconnect structure for the illustrated FPGA. The programmable interconnect element 1011 also includes the connections to and from the programmable logic element within the same tile, as shown by the examples included at the top of FIG. 10.

For example, a CLB 1002 may include a configurable logic element (CLE) 1012 that may be programmed to implement user logic plus a single programmable interconnect element 1011. A BRAM 1003 may include a BRAM logic element (BRL) 1013 in addition to one or more programmable interconnect elements. The BRAM includes dedicated memory separate from the distributed RAM of a configuration logic block. Typically, the number of interconnect elements included in a tile depends on the height of the tile. In the pictured implementation, a BRAM tile has the same height as five CLBs, but other numbers may also be used. A DSP tile 1006 may include a DSP logic element (DSPL) 1014 in addition to an appropriate number of programmable interconnect elements. An IOB 1004 may include, for example, two instances of an input/output logic element (IOL) 1015 in addition to one instance of the programmable interconnect element 1011. The location of connections of the device is controlled by configuration data bits of a configuration bitstream provided to the device for that purpose. The programmable interconnects, in response to bits of a configuration bitstream, enable connections comprising interconnect lines to be used to couple the various signals to the circuits implemented in programmable logic, or other circuits such as BRAMs or the processor.

In the pictured implementation, a columnar area near the center of the die is used for configuration, clock, and other control logic. The config/clock distribution regions 1009 extending from this column are used to distribute the clocks and configuration signals across the breadth of the FPGA. Some FPGAs utilizing the architecture illustrated in FIG. 10 include additional logic blocks that disrupt the regular columnar structure making up a large part of the FPGA. The additional logic blocks may be programmable blocks and/or dedicated logic. For example, the processor block PROC 1010 shown in FIG. 10 spans several columns of CLBs and BRAMs.

Note that FIG. 10 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 10 are purely exemplary. For example, in an actual FPGA more than one adjacent column of CLBs is typically included wherever the CLBs appear in order to facilitate the efficient implementation of user logic. While the implementation of FIG. 10 relates to an integrated circuit having programmable resources, it should be understood that the circuits and methods for enabling the testing of input/output pads.

Figure 11:
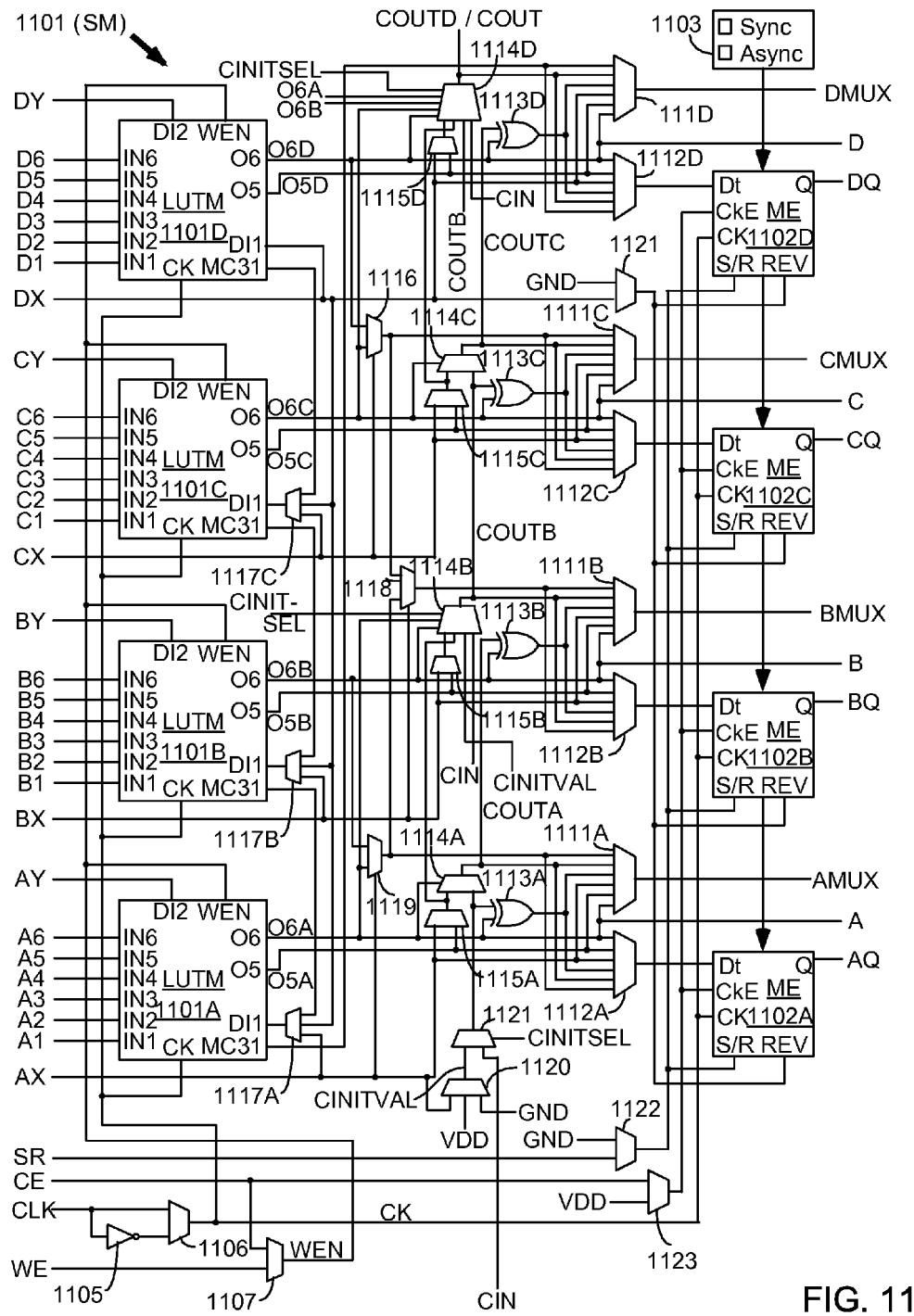
FIG. 11 is a block diagram of a configurable logic element of the integrated circuit of FIG. 10.

Turning now to FIG. 11, a block diagram of a configurable logic element is shown. In particular, FIG. 11 illustrates in simplified form a configurable logic element of a configuration logic block 1002 of FIG. 10. In the implementation of FIG. 11, slice M 1101 includes four lookup tables (LUTMs) 1101A-1101D, each driven by six LUT data input terminals A1-A6, B1-B6, C1-C6, and D1-D6 and each providing two LUT output signals O5 and O6. The O6 output terminals from LUTs 1101A-1101D drive slice output terminals A-D, respectively. The LUT data input signals are supplied by the FPGA interconnect structure via input multiplexers, which may be implemented by programmable interconnect element 1111, and the LUT output signals are also supplied to the interconnect structure. Slice M also includes: output select multiplexers 1111A-1111D driving output terminals AMUX-DMUX; multiplexers 1112A-1112D driving the data input terminals of memory elements 1102A-1102D; combinational multiplexers 1116, 1118, and 1119; bounce multiplexer circuits 1122-1123; a circuit represented by inverter 1105 and multiplexer 1106 (which together provide an optional inversion on the input clock path); and carry logic having multiplexers 1114A-1114D, 1115A-1115D, 1120-1121 and exclusive OR gates 1113A-1113D. All of these elements are coupled together as shown in FIG. 11. Where select inputs are not shown for the multiplexers illustrated in FIG. 11, the select inputs are controlled by configuration memory cells. That is, configuration bits of the configuration bitstream stored in configuration memory cells are coupled to the select inputs of the multiplexers to select the correct inputs to the multiplexers. These configuration memory cells, which are well known, are omitted from FIG. 11 for clarity, as well as from other selected figures herein.

In the pictured implementation, each memory element 1102A-1102D may be programmed to function as a synchronous or asynchronous flip-flop or latch. The selection between synchronous and asynchronous functionality is made for all four memory elements in a slice by programming Sync/Asynch selection circuit 1103. When a memory element is programmed so that the S/R (set/reset) input signal provides a set function, the REV input terminal provides the reset function. When the memory element is programmed so that the S/R input signal provides a reset function, the REV input terminal provides the set function. Memory elements 1102A-1102D are clocked by a clock signal CK, which may be provided by a global clock network or by the interconnect structure, for example. Such programmable memory elements are well known in the art of FPGA design. Each memory element 1102A-1102D provides a registered output signal AQ-DQ to the interconnect structure. Because each LUT 1101A-1101D provides two output signals, O5 and O6, the LUT may be configured to function as two 5-input LUTs with five shared input signals (IN1-IN5), or as one 6-input LUT having input signals IN1-IN6.

In the implementation of FIG. 11, each LUTM 1101A-1101D may function in any of several modes. When in lookup table mode, each LUT has six data input signals IN1-IN6 that are supplied by the FPGA interconnect structure via input multiplexers. One of 64 data values is programmably selected from configuration memory cells based on the values of signals IN1-IN6. When in RAM mode, each LUT functions as a single 64-bit RAM or two 32-bit RAMs with shared addressing. The RAM write data is supplied to the 64-bit RAM via input terminal DI1 (via multiplexers 1117A-1117C for LUTs 1101A-1101C), or to the two 32-bit RAMs via input terminals DI1 and DI2. RAM write operations in the LUT RAMs are controlled by clock signal CK from multiplexer 1106 and by write enable signal WEN from multiplexer 1107, which may selectively pass either the clock enable signal CE or the write enable signal WE. In shift register mode, each LUT functions as two 16-bit shift registers, or with the two 16-bit shift registers coupled in series to create a single 32-bit shift register. The shift-in signals are provided via one or both of input terminals DI1 and DI2. The 16-bit and 32-bit shift out signals may be provided through the LUT output terminals, and the 32-bit shift out signal may also be provided more directly via LUT output terminal MC31. The 32-bit shift out signal MC31 of LUT 1101A may also be provided to the general interconnect structure for shift register chaining, via output select multiplexer 1111D and CLE output terminal DMUX. Accordingly, the circuits and methods set forth above may be implemented in a device such as the devices of FIGS. 10 and 11, or any other suitable device.

Figure 12:
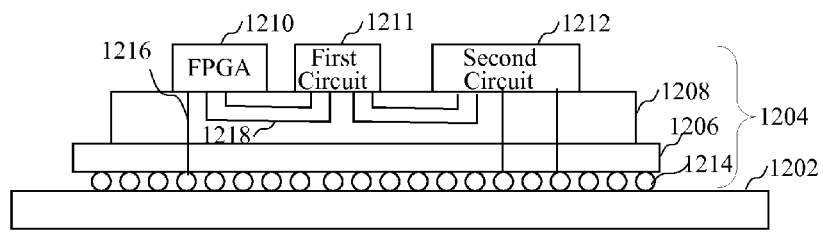
FIG. 12 is a block diagram of an integrated circuit having multiple die.

Turning now to FIG. 12, a block diagram of an integrated circuit having multiple die is shown. According to the embodiment of FIG. 12, a circuit board 1202, such as a printed circuit board, is configured to receive a multi-die integrated circuit 1204. The multi-die integrated circuit 1204 comprises a substrate 1206 coupled to receive an interposer circuit 1208. The interposer 1208 enables coupling multiple integrated circuit chips or die, such as FPGA chips 1210 and first and second circuits 1211 and 1212, to the substrate 1206. The interposer circuit 1208 could be implemented as shown in FIG. 3 describing the programmable interconnects. Solder balls 1214 enabling enable coupling signals from the various chips to the circuit board 1202 by way of various interconnects 1216, such as through silicon vias (TSVs). Interconnects 1218 also enable the routing of signals between the various chips of the multi-die integrated circuit. The interposer circuit 1208 may be a silicon substrate with various metal layers comprising interconnect elements enabling the routing of signals between the FPGA chips and the data converter chip or between one of the chips and the substrate 1206. However, the interposer circuit could be any material having conductive elements which enable routing signals as shown. While all of the circuits of the FPGA chips 1210 and the data converter chip 1212 could be implemented on a single die, the embodiment of FIG. 12 enables more efficiently implementing the various circuits of FPGA chips 1210 and the data converter chip 1212. For example, some circuits may be more efficiently implemented in an integrated circuit chip manufactured according to one process, such as a process forming transistors of a certain dimension, while other circuits may be implemented more efficiently in an integrated circuit chip manufactured according to another process.

Figure 13:
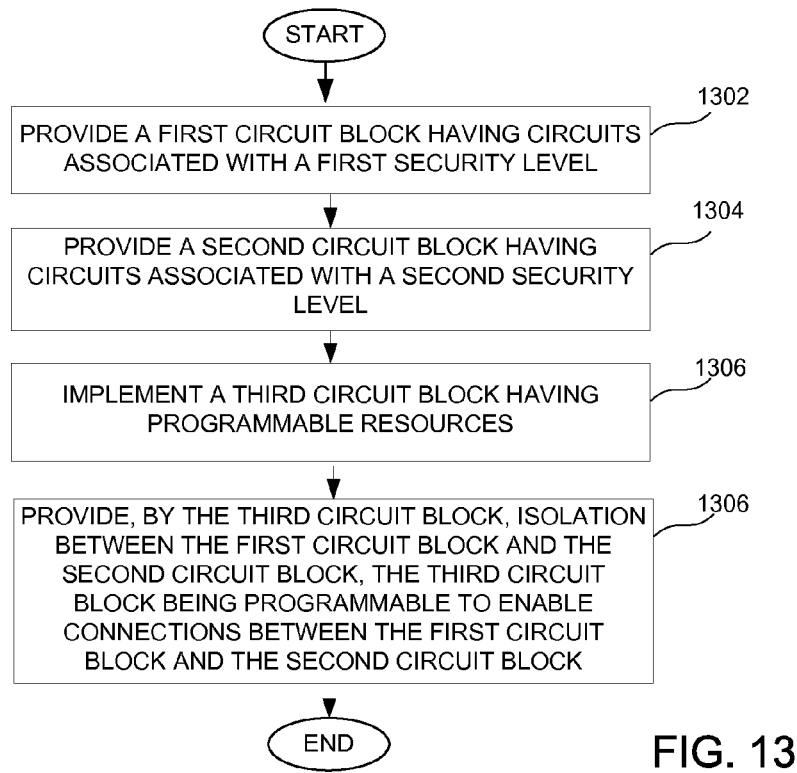
FIG. 13 is a flow chart showing a method of providing isolation in an integrated circuit.

Turning now to FIG. 13, a flow chart shows a method of providing isolation in an integrated circuit. In particular, a first circuit block having circuits associated with a first security level is provided at a block 1302. A second circuit block having circuits associated with a second security level is provided at a block 1304. A third circuit block having programmable resources, is implemented at a block 1306. Isolation between the first circuit block and the second circuit block is provided by the third circuit block which is programmable to enable connections between the first circuit block and the second circuit block, at a block 1308.

Figure 14:
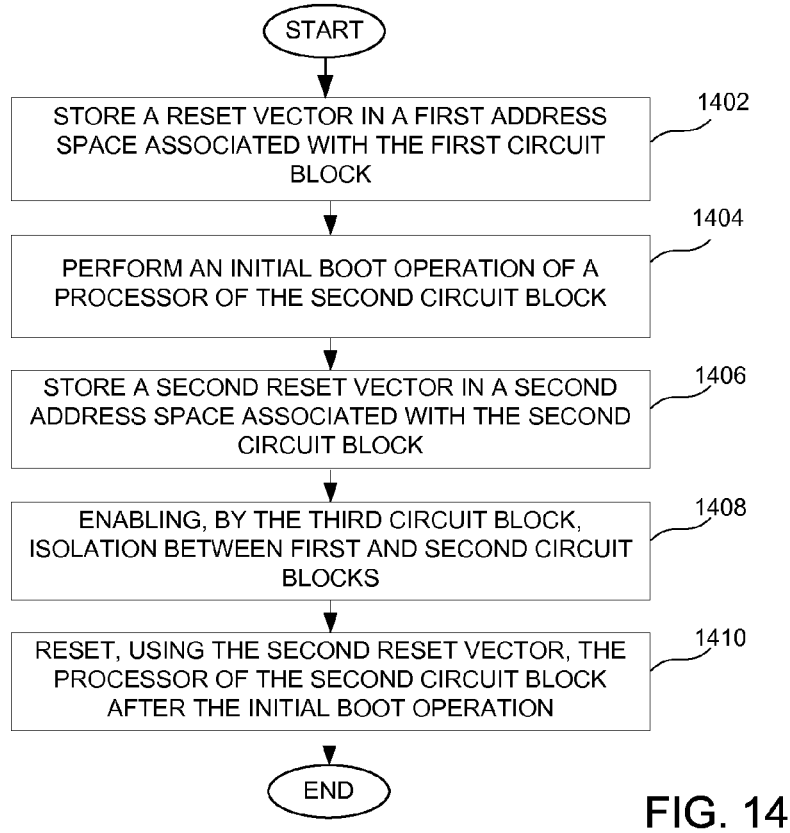
FIG. 14 is a flow chart showing another method of providing isolation in an integrated circuit.

Turning now to FIG. 14, a flow chart shows another method of providing isolation in an integrated circuit. A reset vector is stored in a first address space in the first circuit block at a block 1402. An initial boot operation of a processor of the second circuit block is performed at a block 1404. A second reset vector is stored in a second address space in the second circuit block at a block 1406. The processor of the second circuit block is reset using the second reset vector after the initial boot operation at a block 1408.

The various elements of the methods of FIGS. 13 and 14 may be implemented using the circuits of FIGS. 1-12 as described, or using some other suitable circuits. While specific elements of the method are described, it should be understood that additional elements of the methods, or additional details related to the elements, could be implemented according to the disclosure of FIGS. 1-12.

It can therefore be appreciated that the new and novel circuits and methods of providing isolation in an integrated circuit has been described. It will be appreciated by those skilled in the art that numerous alternatives and equivalents will be seen to exist which incorporate the disclosed invention. As a result, the invention is not to be limited by the foregoing embodiments, but only by the following claims.

We claim:

1. A circuit for providing isolation in an integrated circuit, the circuit comprising:
   a first circuit block having circuits associated with a first security level;
   a second circuit block having circuits associated with a second security level; and
   a third circuit block having programmable resources, the third circuit block providing isolation between the first circuit block and the second circuit block and being programmable to enable connections between the first circuit block and the second circuit block.

2. The circuit of claim 1 wherein the first circuit block comprises a low power domain.

3. The circuit of claim 2 wherein the second circuit block comprises a full power domain.

4. The circuit of claim 1 wherein the first circuit block comprises a first clock source and the second circuit block comprises a second clock source, wherein the first clock source is isolated from the second circuit block.

5. The circuit of claim 1 wherein the third circuit block comprises a plurality of programmable interconnects which enable the connections between the first circuit block and the second circuit block.

6. The circuit of claim 1 wherein all connections between the first circuit block and the second circuit block are provided by way of the third circuit block.

7. The circuit of claim 1 wherein the third circuit block comprises control gates controlling the transfer of signals between the first circuit block and the second circuit block.

8. A circuit for providing isolation in an integrated circuit, the circuit comprising:
   a low-power sub-system having circuits associated with a first security level;
   a full-power sub-system having circuits associated with a second security level; and
   programmable interconnect elements coupled between the low-power sub-system and the full-power sub-system, wherein the programmable interconnect elements provides isolation between the low-power sub-system and the full-power sub-system, and connections between the low-power sub-system and the full-power sub-system are enabled by the programmable interconnect elements.

9. The circuit of claim 8 further comprising a control circuit which controls the programmable interconnect elements.

10. The circuit of claim 9 wherein the control circuit enables exchanging data between the low-power sub-system and the full power sub-system.

11. The circuit of claim 8 wherein the low-power sub-system comprises a first clock circuit.

12. The circuit of claim 8 wherein the full-power sub-system comprises a second clock circuit, and the first clock circuit is isolated from the full-power sub-system.

13. The circuit of claim 8 further comprising a first address space associated with the low-power sub-system storing a first reset vector for the full-power sub-system which enables an initial boot operation of a processor of the full-power sub-system.

14. The circuit of claim 13 further comprising a second address space associated with the full-power sub-system storing a second reset vector of the full-power sub-system which enables resetting the processor of the full power sub-system after the initial boot operation.

15. A method of providing isolation in an integrated circuit, the method comprising:
   providing a first circuit block having circuits associated with a first security level;
   providing a second circuit block having circuits associated with a second security level;
   implementing a third circuit block having programmable resource; and
   providing, by the third circuit block, isolation between the first circuit block and the second circuit block, wherein the third circuit block is programmable to enable connections between the first circuit block and the second circuit block.

16. The method of claim 15 further implementing a control circuit which controls programmable interconnect elements of the programmable resources of the third circuit block, wherein the control circuit enables exchanging data between the first circuit block and the second circuit block.

17. The method of claim 15 further comprising isolating a first clock circuit of the first circuit block from the second circuit block.

18. The method of claim 15 further comprising storing a reset vector in a first address space associated with the first circuit block for an initial boot operation of a processor of the second circuit block.

19. The method of claim 18 further comprising storing a second reset vector in a second address space associated with the second circuit block, wherein the second reset vector enables resetting the processor of the second circuit block after the initial boot operation.

20. The method of claim 15 wherein providing isolation between the first circuit block and the second circuit block comprises implementing enable circuits which enable the communication between first circuit block and the second circuit block.

\* \* \* \* \*